United States Patent [19]

Holland et al.

[11] Patent Number: 4,910,063

[45] Date of Patent: Mar. 20, 1990

[54] INSULATING MODULE

[75] Inventors: David L. Holland, Riverside; Thomas M. Miller, Walnut, both of Calif.; Wesley McLane, Prairieville, La.

[73] Assignee: Maxadyne, Inc., City of Industry, Calif.

[21] Appl. No.: 242,890

[22] Filed: Sep. 12, 1988

[51] Int. Cl.[4] .................................................. B32B 3/06

[52] U.S. Cl. ...................................... 428/99; 428/120; 428/131; 428/137; 428/920; 110/336; 52/506

[58] Field of Search ................. 428/120, 99, 920, 131, 428/137; 110/336; 52/506

[56] References Cited

U.S. PATENT DOCUMENTS

| | | | |
|---|---|---|---|
| 1,495,896 | 5/1924 | Ferguson . | |
| 1,553,004 | 9/1925 | Packard . | |
| 1,891,604 | 12/1932 | Peiler . | |
| 1,944,569 | 1/1934 | Nygaard . | |
| 3,030,669 | 4/1962 | Dosker . | |
| 3,587,198 | 6/1971 | Hensel . | |
| 3,804,050 | 4/1974 | Iarossi . | |
| 4,107,890 | 8/1978 | Seghezzi et al. | 110/336 |
| 4,289,479 | 9/1981 | Johnson, Jr. . | |
| 4,379,382 | 4/1983 | Sauder . | |
| 4,670,318 | 6/1987 | Uchiya et al. . | |
| 4,675,223 | 6/1987 | Trummer . | |

*Primary Examiner*—Alexander S. Thomas
*Attorney, Agent, or Firm*—A. W. Breiner

[57] ABSTRACT

A module of the type used in insulating the wall of a high-temperature furnace comprising a planar face, a hub joined and extending rearwardly from substantially the mid-point of the surface opposite the planar face, and a plurality of radial members extending outwardly from the hub is described. Preferably the entire module is integral. The module can be used in combination with an attachment which fits over the hub for attaching the module to a furnace wall. Blanketing material can be used with the module to vary the heat-insulating characteristics of the module. The module, which is easily attached to a furnace wall, can be cut along any of its edges without varying the heat-insulating characteristics of the module, permitting the installation of the modules on a furnace wall without substantial pre-engineering.

15 Claims, 2 Drawing Sheets

INSULATING MODULE

RELATED APPLICATION

This invention relates to United States Application Ser. No. 180,452 filed Apr. 12, 1988 in the names of David L. Holland and Thomas M. Miller entitled "Porous Pattern Molding Process."

FIELD OF INVENTION

This invention relates to insulating modules of the type used in lining a high-temperature furnace. More particularly, this invention relates to molded ceramic modules which can be rapidly installed on a furnace wall to have predetermined insulation characteristics.

BACKGROUND OF INVENTION

Molded modules having selective shapes and configurations are described in commonly assigned application Ser. No. 180,452 filed Apr. 12, 1988 in the names of David L. Holland and Thomas M. Miller entitled "Porous Pattern Molding Process," the disclosure thereof being incorporated herein by reference. According to the aforesaid application, a molded article is fabricated by first forming a pattern from a porous material of the internal or external surface of the desired article. The pattern formed from the porous material, such as an open-cell foam, is brought into contact with a fluid bath such as a water or air bath, containing suspended therein in fibrous or particulate form the material to be used in forming the article. When the pattern is in contact with the bath, a vacuum is applied to the porous pattern, pulling the suspended material to the exposed surfaces of the pattern and drawing the suspending fluid of the bath through the porous pattern. The vacuum is continuously applied until the deposit of material has the desired thickness. The article, including the porous pattern, is then dried and the porous pattern removed, for example by heating, to eliminate the porous pattern material, leaving voids where the pattern had been. This application describes various module shapes and configurations which can be constructed according to the process of the application, including modules having internal and external voids.

The present invention is directed to an improved module of the type used in lining high-temperature furnaces having an X-shaped or star-shaped design with predetermined heat-insulating characteristics made according to the process described in the aforesaid application which can be easily attached to a surface such as a furnace wall. The module can be cut along any of its edges to fit into a given area of the surface without substantially affecting the structural strength or heat-insulating characteristics of the module.

GENERAL DESCRIPTION OF INVENTION

The modules of the present invention which are of the type used in insulating a wall of a high-temperature furnace or the like comprise a first portion having a planar face, a hub extending rearwardly substantially from the midpoint of the surface opposite the planar face, and a plurality of radial members extending outwardly from the hub. The radial members which are joined to the hub and to the surface opposite the planar face provide a design such as an X-shaped or star-shaped design for receiving, if desired, a ceramic blanket material. Preferably the planar face, hub, and radial members are integrally formed and of a ceramic material.

In a preferred embodiment, the planar face is rectangular, having a thickness preferably of from about one-half inch to about four inches to control the heat-insulating characteristics of the module. Further, the depth of the hub and the radial members extending rearwardly from the planar face can vary in depth, preferably of from about two to eight inches or more to further control the heat-insulating characteristics of the module.

In the event a ceramic blanketing material is used with the module, the blanket is preferably die cut in one or a plurality of layers with a cutter mated to the shape of the planar face and radial members so that the blanketing material will fit snugly onto the module rearward of and coextensive with the planar face, and so as to embed the hub and radial members.

An attachment such as a metal attachment is fitted over or to the hub of the module. The module can include a hole through the center of the planar face, through the hub of the module and attachment. This hole will permit the anchoring of the module directly to a metal surface of a furnace wall, for example, with a stud welding gun.

The module of this invention is unique in that it is easily attached to a surface such as a furnace wall and its heat-insulating characteristics can be varied by varying the thickness of the planar face, and/or by varying the depth of the hub and radial members, and/or by use of varying thicknesses of blanketing material cut to mate with the hub add radial members of the module design. The modules need not be pre-engineered for a particular furnace wall since the module can be cut along any of its edges without substantially weakening or varying the heat characteristics of the module. For example, a twenty-inch module can be cut down to a sixteen-inch module, or any one side of the module can be cut to provide a module having a desired size, such as 20"×16", to fit into a particular location.

Although the module is preferably constructed from a ceramic material, the module can be constructed from any heat-insulating or other fibrous or particulate materials of the type described in application Ser. No. 180,452. Furthermore, although the module is preferably made in accordance with the process of application Ser. No. 180,452, it can be constructed using other molding processes, including conventional split molds and the like. Although the blanketing material is preferably of a ceramic material, it can be of any material which has heat-insulating characteristics.

BRIEF DESCRIPTION OF THE DRAWING

Having described the invention in general terms, the module will be described in greater detail with reference to the drawing wherein

Referring to the drawing, FIG. 1 illustrates a high-temperature furnace 10 showing the module 20 of the present invention fastened to the walls of the furnace through a stud hole 22 in the center face of the module. Each module 20 comprises a planar face 24, a hub 26 extending rearwardly from face 24, and a plurality of radial arms 28 extending from hub 26. Preferably this entire module is constructed as an integral unit by the porous pattern molding process described in application Ser. No. 180,452. The heat-insulating characteristics of the module can be modified by varying the thickness of planar face 24 and by varying the depths of hub 26 and radial arms 28.

Figure 6:
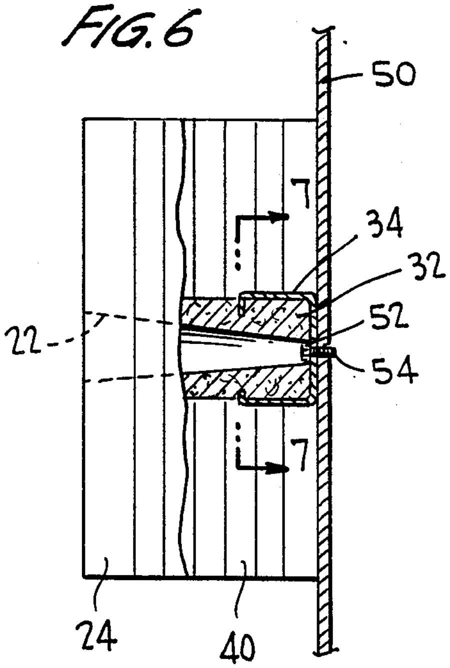
FIG. 6 is a partially broken-away view of a module installed on a furnace wall.
Figure 7:
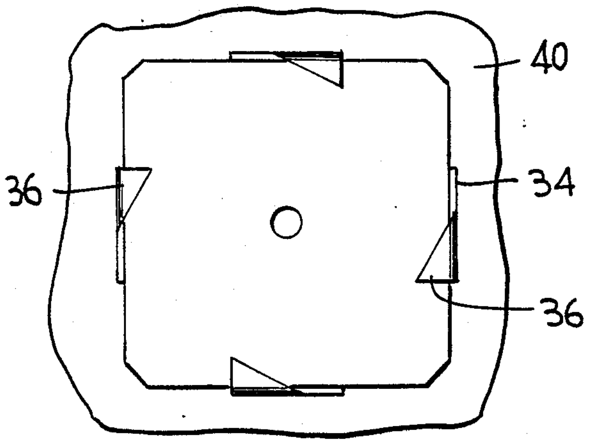
FIG. 7 is a view along line 7—7 of FIG. 6.

A metal attachment member 30 having a flat base 32 and projections 34 extending at right angles to base 32 is fitted onto the end of hub 26 and anchored thereto with prongs 36 extending inwardly from projections 34 as best shown in FIGS. 6 and 7.

Figure 1:
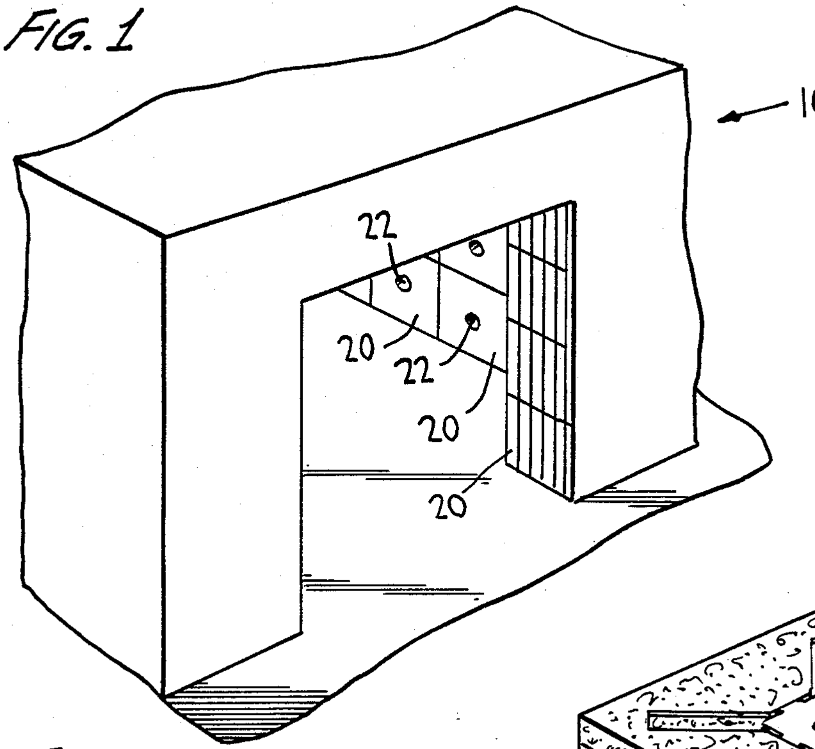
FIG. 1 is a perspective, generalized view of an environment of use of the module of the present invention.
Figure 2:
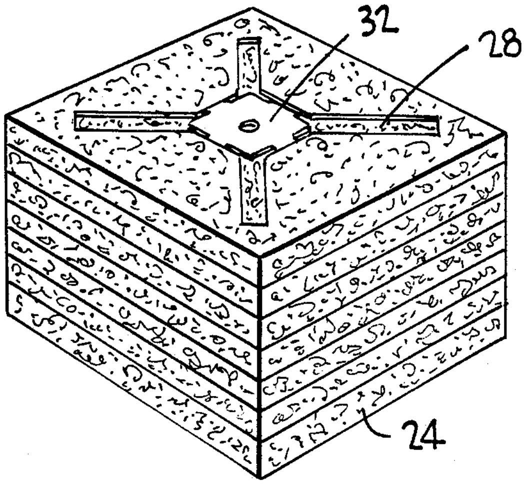
FIG. 2 is a perspective view of an individual module of this invention in combination with attachment means and blanketing material ready for installation on a furnace wall.
Figure 3:
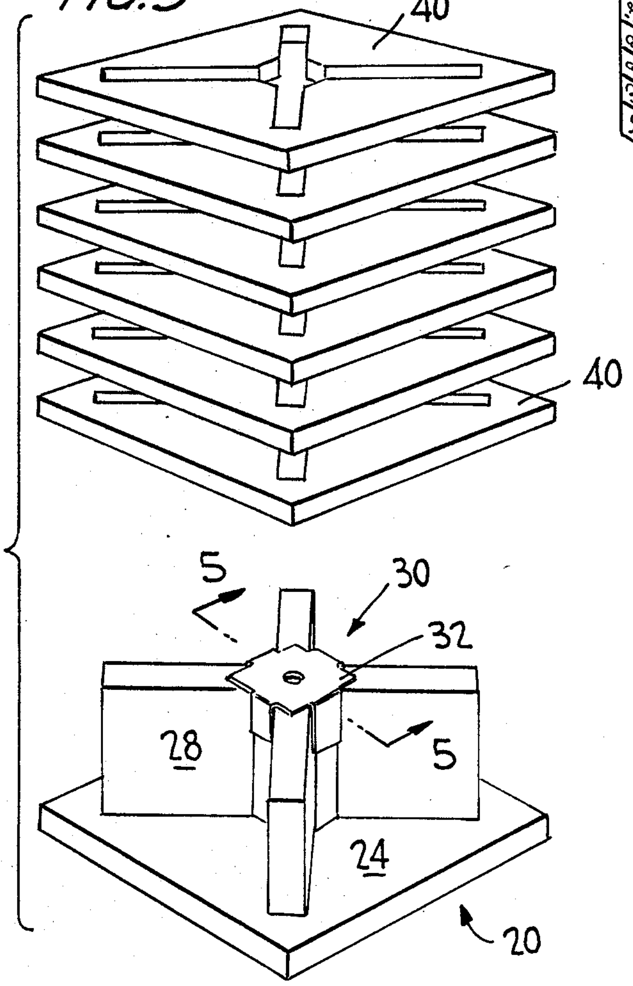
FIG. 3 is a partially exploded view of the combination of FIG. 2.
Figure 4:
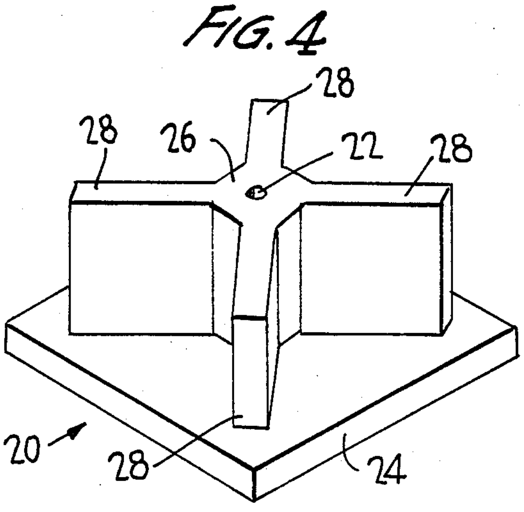
FIG. 4 is a perspective view of the vacuum formed portion of the module of the present invention.

A plurality of layers 40 of ceramic blanketing material are cut, for example with a die cutter, in a pattern mated to the design of the hub, radial arms, and planar face of the module 20. As best shown in FIGS. 3 and 4, the radial arms are dimensioned with respect to the planar face in order that they do not extend to the edges of planar face 24 in order that the blanketing material when fitted onto the rearwardly extending hub and radial arms will be coextensive with the edges of planar face 24. This provides a square-cut, finished unit.

Figure 5:
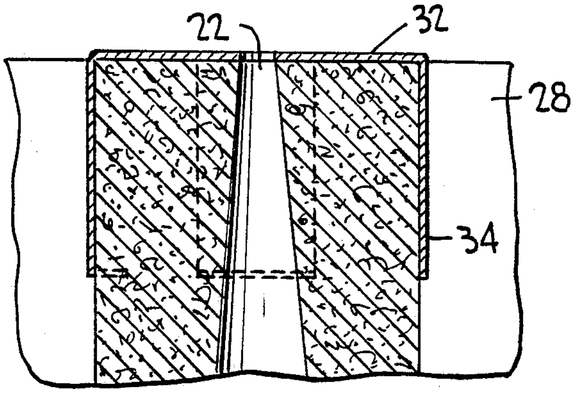
FIG. 5 is a sectional view through line 5—5 of FIG. 3.

In a preferred embodiment, as above set forth, a hole 22 is drilled through the center of planar face 24 and directly through the hub 26. In this embodiment it is also preferred that the hole have a taper. When the hole is the largest at the planar face and smallest at the end of the hub 26, as best shown in FIGS. 5 and 6, this taper permits the easy placement of a stud welder or other welding gun, or for that matter the placement of a bolt, in order to rapidly attach the module to a furnace wall surface 50 as shown in FIG. 6. The taper in the opposite direction, not shown, permits the easy filling of the hole after installation of the module, if desired, with a ceramic paste or similar heat-insulating material. The taper helps retain the paste or the like in place.

As shown in FIG. 6, the module is anchored to wall 50 with a nut 52 to a bolt 54 extending from furnace wall 50. Various other means can be used for attachment of the stud. For example, for certain applications it may be preferable to embed an anchoring plate such as plate 30 into the end of the hub away from the planar face during the molding process. In this way a bolt can be passed through the center of the anchoring plate and a bolt drawn down, or the unit can be stud-welded to secure the module to the furnace wall. Additionally, projections can extend from the embedded attachment, or in an exposed attachment, and be embedded during the molding operation into the radial arms. This can provide, for certain applications, increased structural strength to the module. This increased structural strength can be advantageous in certain areas of a furnace such as the ceiling of the furnace, or in furnaces which are subjected to substantial vibration during operation of the furnace.

Figure 8:
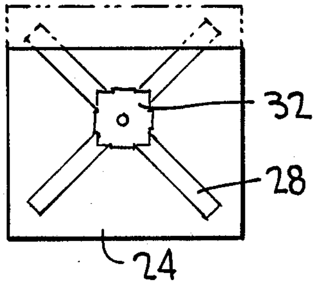
FIG. 8 is a view from the top of a module of FIG. 2 partly in phantom lines cut along one side.
Figure 9:
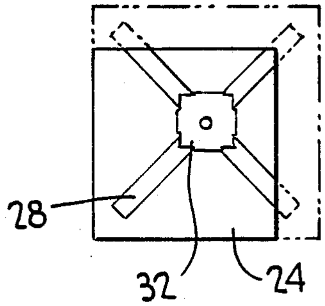
FIG. 9 is a view from the top of a module of FIG. 2 partly in phantom lines cut along two sides.

FIGS. 8 and 9 illustrate in phantom lines the cutting of a module of the present invention along one or two sides of the module in order to dimension the module for positioning the module in a particular part of the furnace, for example when completing the installation. As will be apparent, the cutting of the module due to the design of the module will not substantially weaken or affect the heat-insulating characteristics of the module. This ability to cut the module without substantial weakening of the module or affecting the heat-insulating characteristics permits the construction of a furnace without detailed pre-engineering of the furnace. This greatly reduces the cost of a furnace installation.

As will be apparent to one skilled in the art, various modifications can be made within the scope of the aforesaid description. Such modifications being within the ability of one skilled in the art form a part of the present invention and are embraced by the appended claims.

It is claimed:

1. A ceramic fiber module used in insulating a high-temperature furnace comprising a first portion having a planar face having a predetermined thickness, a hub joined to the said first portion and extending rearwardly substantially from the mid-point of the surface opposite the planar face, and a plurality of radial members extending outwardly from said hub; said hub and radial members having a predetermined depth.

2. The module of claim 1 wherein the planar face has a thickness of about 0.5 inch to 4 inches.

3. The module of claim 1 or 2 wherein the hub and radial members have a depth of at least about two inches.

4. The module of claim 1 wherein the module is rectangular.

5. The module of claim 4 wherein the rectangle is a square.

6. The module of claim 5 wherein a hole extends from the planar face through the hub.

7. The module of claim 6 wherein the hole is tapered.

8. The module of claim 7 wherein the plurality of radial members is four.

9. An article comprising in combination a module used in insulating the wall of a high-temperature furnace comprising a first portion having a planar face having a predetermined thickness, a hub joined to the said first portion and extending rearwardly substantially from the mid-point of the surface opposite the planar face, and a plurality of radial members extending outwardly from said hub; said hub and radial members having a predetermined depth; a metal attachment placed on the end of said hub for attachment of said module to a furnace wall.

10. The article of claim 9 wherein said planar face has a thickness of from about 0.5 inch to 4 inches.

11. The article of claim 9 or 10 wherein the hub and radial members have a depth of at least about two inches.

12. The article of claim 9 further including at least one layer of heat-insulating blanketing material which is cut and positioned on said hub to at least partially embed said hub and radial members.

13. The article of claim 12 wherein a plurality of layers of blanketing material are utilized.

14. The article of claim 13 wherein the end of the radial member opposite of its attachment to the hub is spaced from the edge of said planar face and said blanketing material is cut to be coextensive with the edges of the planar face.

15. The article of claim 13 wherein the end of the radial member opposite of its attachment to the hub is spaced from the edge of said planar face and said blanketing material is cut to have an outer diameter larger than the edges of the planar face.

* * * * *